United States Patent
Adams et al.

(10) Patent No.: US 11,204,134 B2
(45) Date of Patent: Dec. 21, 2021

(54) INDEPENDENT SECONDARY INDICATOR FOR VAPOR VALVE ACTUATION

(71) Applicant: Betts Industries, Inc., Warren, PA (US)

(72) Inventors: David J. Adams, Warren, PA (US); Michael W. Gustafson, Warren, PA (US)

(73) Assignee: Betts Industries, Inc., Warren, PA (US)

( * ) Notice: Subject to any disclaimer, the term of this patent is extended or adjusted under 35 U.S.C. 154(b) by 0 days.

(21) Appl. No.: 15/931,395

(22) Filed: May 13, 2020

(65) Prior Publication Data

US 2020/0363015 A1 Nov. 19, 2020

Related U.S. Application Data

(60) Provisional application No. 62/848,340, filed on May 15, 2019.

(51) Int. Cl.
| | |
|---|---|
| *F17C 13/04* | (2006.01) |
| *F16K 15/06* | (2006.01) |
| *F16K 24/00* | (2006.01) |
| *F16K 27/02* | (2006.01) |
| *F16K 27/12* | (2006.01) |
| *F16K 17/04* | (2006.01) |

(52) U.S. Cl.
CPC ............ *F17C 13/04* (2013.01); *F16K 15/063* (2013.01); *F16K 24/00* (2013.01); *F16K 27/0209* (2013.01); *F16K 27/12* (2013.01); *F16K 17/04* (2013.01); *F17C 2250/0626* (2013.01)

(58) Field of Classification Search
CPC ........ F17C 13/04; F16K 15/063; F16K 24/00; F16K 27/0209; F16K 27/12
See application file for complete search history.

(56) References Cited

U.S. PATENT DOCUMENTS

| | | | | |
|---|---|---|---|---|
| 3,251,336 | A | * | 5/1966 | O'Brien .............. F16K 37/0008 116/270 |
| 3,462,994 | A | * | 8/1969 | Maust ................ F16K 37/0041 137/557 |

\* cited by examiner

*Primary Examiner* — Reinaldo Sanchez-Medina
*Assistant Examiner* — Nicole Gardner
(74) *Attorney, Agent, or Firm* — Jonathan M. D'Silva; MMI Intellectual Property

(57) ABSTRACT

A secondary indicator for a vapor recovery valve is presented. The vapor recovery valve comprises a piston and a primary indicator, the primary indicator is attached to the piston, and the piston moves linearly in relation to the actuation of the valve and moves proportionally in conjunction with the piston to provide a visual indication that the valve has actuated. The secondary indicator is mounted to the vapor recovery valve and is not attached to the primary indicator. The secondary indicator comprises a signal, a torsional spring, and a fixed pin. The secondary indicator is second class lever, the torsional spring is the effort, the fixed pin is the fulcrum, and the primary indicator is the load between the torsional spring and the fixed pin, such that the signal rotates with the linear movement of the primary indicator to multiply the effect of the primary indicator.

6 Claims, 6 Drawing Sheets

INDEPENDENT SECONDARY INDICATOR FOR VAPOR VALVE ACTUATION

BACKGROUND

Volatile liquids are often transported in cargo tanks mounted to tractor trailers, trains, or other vehicles. Depending on the type of liquid being transported there are requirements for the capture of vapor for public safety and environmental protection. Vapor valves are used to allow the capture of vapor from volatile liquids contained in those tanks as well as to provide pressure equalization when the tank is filled or drained.

The vapor valves are often pneumatically or hydraulically operated and plumbed sequentially or non-sequentially to the bottom loading/unloading valves. When loading or unloading, it is beneficial for the vapor recovery valve to open first, allowing for pressure equalization and the capture of vapor. It is industry recommended practice for the vapor valve to have means to provide indication of its actuation (visual, audible, or electronic).

Vapor valves are usually mounted to the top of cargo tanks and are contained in the spill-dam area. Components mounted in the spill-dam area are required to be protected by rollover damage protection device which is usually consists of a structural frame-work or rail built into body of the cargo tank. The vapor valve is required to be lower than the rollover damage protection device which poses difficulty for the tank operator at ground level to visually verify the vapor valve is in the open position. For safety reasons, tank operators are often restricted from climbing on top of the tank to visually verify the actuation of the vapor valve. Typical visual indicators are limited by usable stroke of the hydraulic/air piston system. It is beneficial to have the indication mechanisms contained within the rollover damage protection device of a cargo tank and independent from the vapor valve.

SUMMARY

A secondary indicator for a vapor recovery valve is presented. The vapor recovery valve comprises a piston and a primary indicator, the primary indicator is attached to or is part of the piston, and the piston moves linearly in relation to the actuation of the valve and moves proportionally in conjunction with the stroke of the valve to provide a visual indication that the valve has actuated. The secondary indicator is mounted to the vapor recovery valve and is not attached to the primary indicator. The secondary indicator comprises a signal, a torsional spring, and a fixed pin. The secondary indicator is second class lever, the torsional spring is the effort, the fixed pin is the fulcrum, and the primary indicator is the load between the torsional spring and the fixed pin, such that the signal rotates with the linear movement of the primary indicator to multiply the effect of the primary indicator.

The signal of the secondary indicator has the shape of a flag or a post. In some embodiments, the rotation of the signal triggers a tertiary indicator that could be an electronic alarm or an audible alarm. Some embodiments of the secondary indicator are mounted to a rotational plate that is further mounted onto the valve. In these embodiments, the rotational plate allows 360 degree rotation of the secondary indicator relative to the valve.

This invention is capable of embodiments that are different from those shown that details of the devices and methods can be changed in various manners without departing from the scope of this invention. Accordingly, the drawings and descriptions are to be regarded as including such equivalent embodiments as to not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
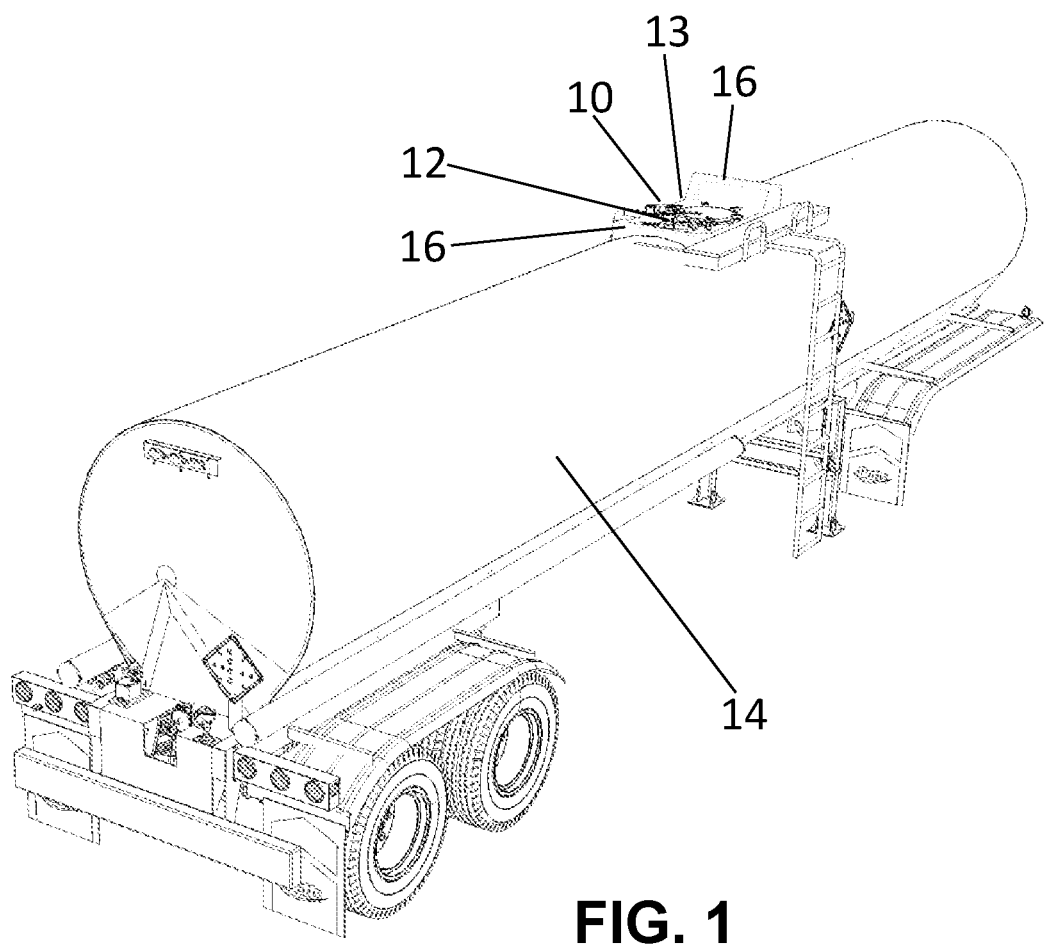
FIG. 1 is a view of a tanker showing a vapor valve with a secondary indicator installed.
Figure 2:
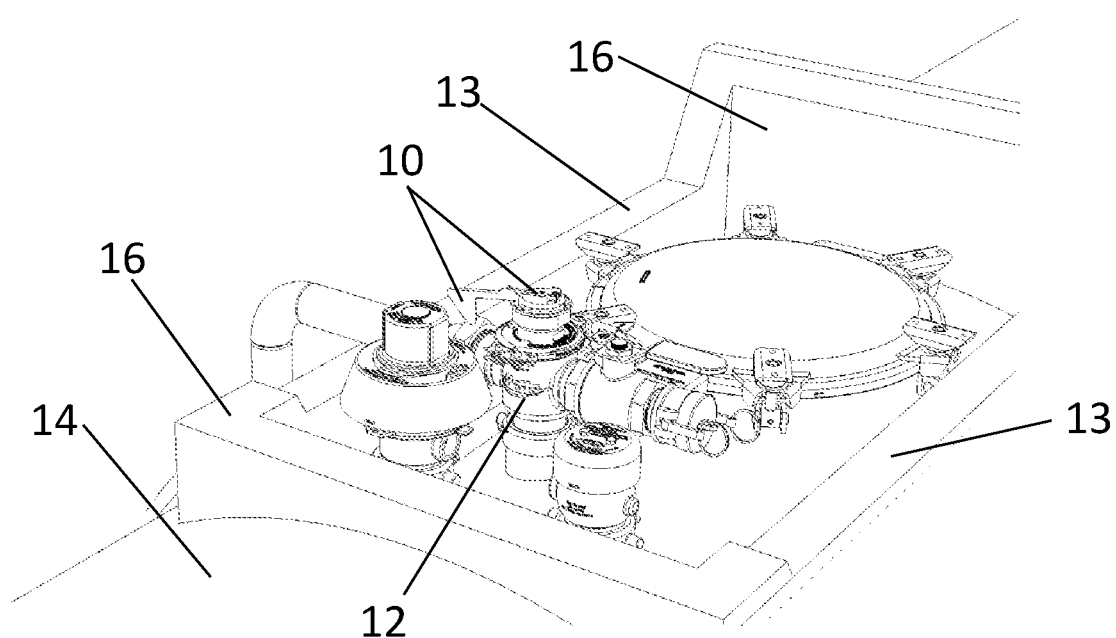
FIG. 2 is a close up view of the vapor valve of FIG. 1.

FIGS. 1 and 2 show an example of a secondary indicator 10 that is attached to a vapor recovery valve 12. Vapor recovery valves 12 are typically mounted on the top of a tanker 14 to allow the capture of vapor from volatile liquids contained in the tanker 14 as well as to provide pressure equalization when the tanker 14 is filled or drained. The vapor recovery valve 12 is typically mounted in a spill dam area 13 and is additionally protected by a rollover damage protection device 16 which in this case, is shown as a structural barrier. In many cases the rollover damage protection 16 is in both front and back of the spill dam 13 but the back section was removed in this illustration to show the components in the spill dam area. A closed vapor recovery valve 12 must be lower than the height of the rollover damage protection 16.

Figure 3:
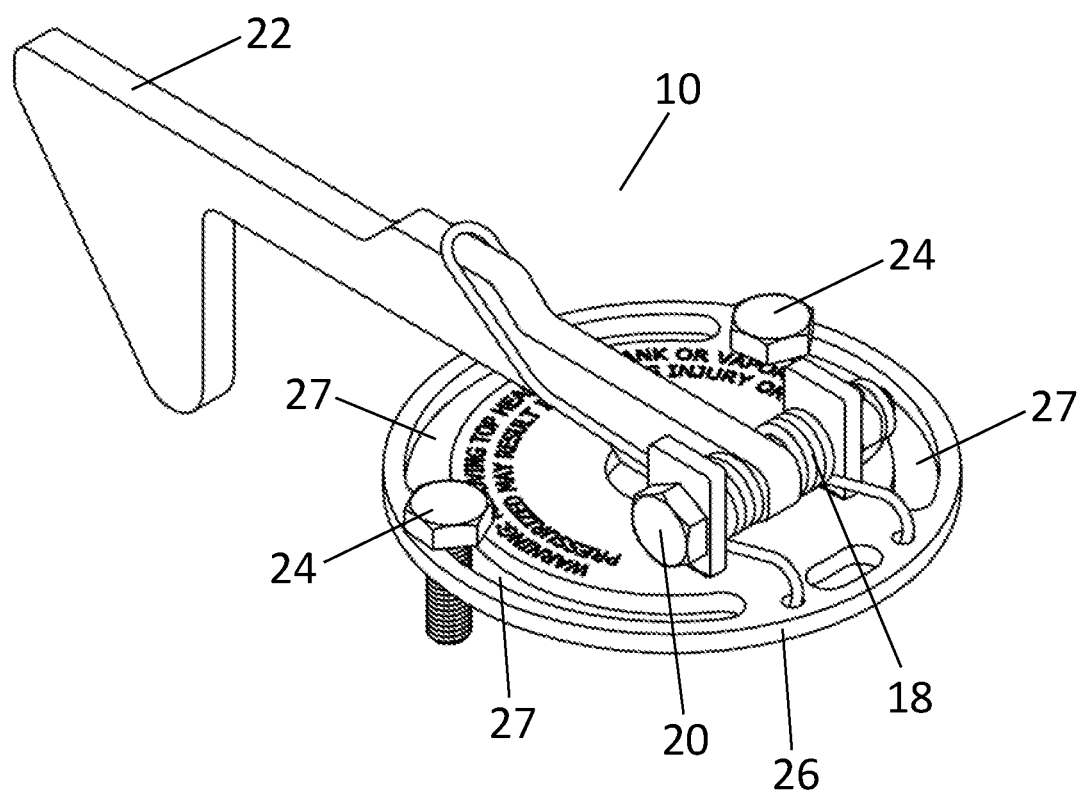
FIG. 3 is an isometric view of the secondary indicator in the closed position.
Figure 4:
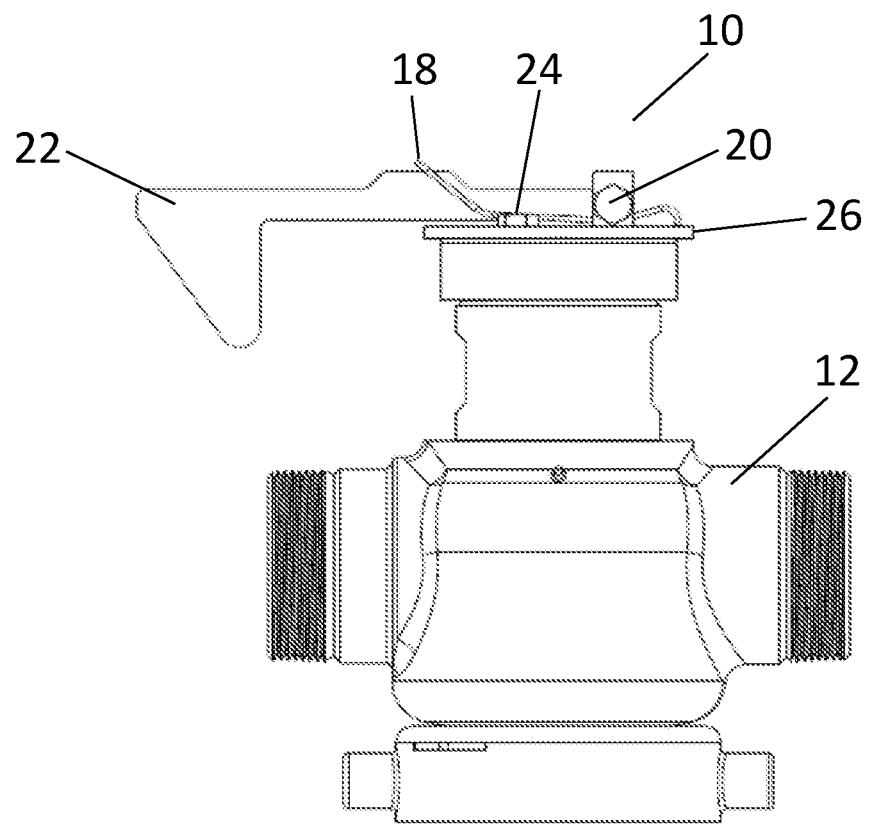
FIG. 4 is the secondary indicator mounted to a valve in the closed position.
Figure 5:
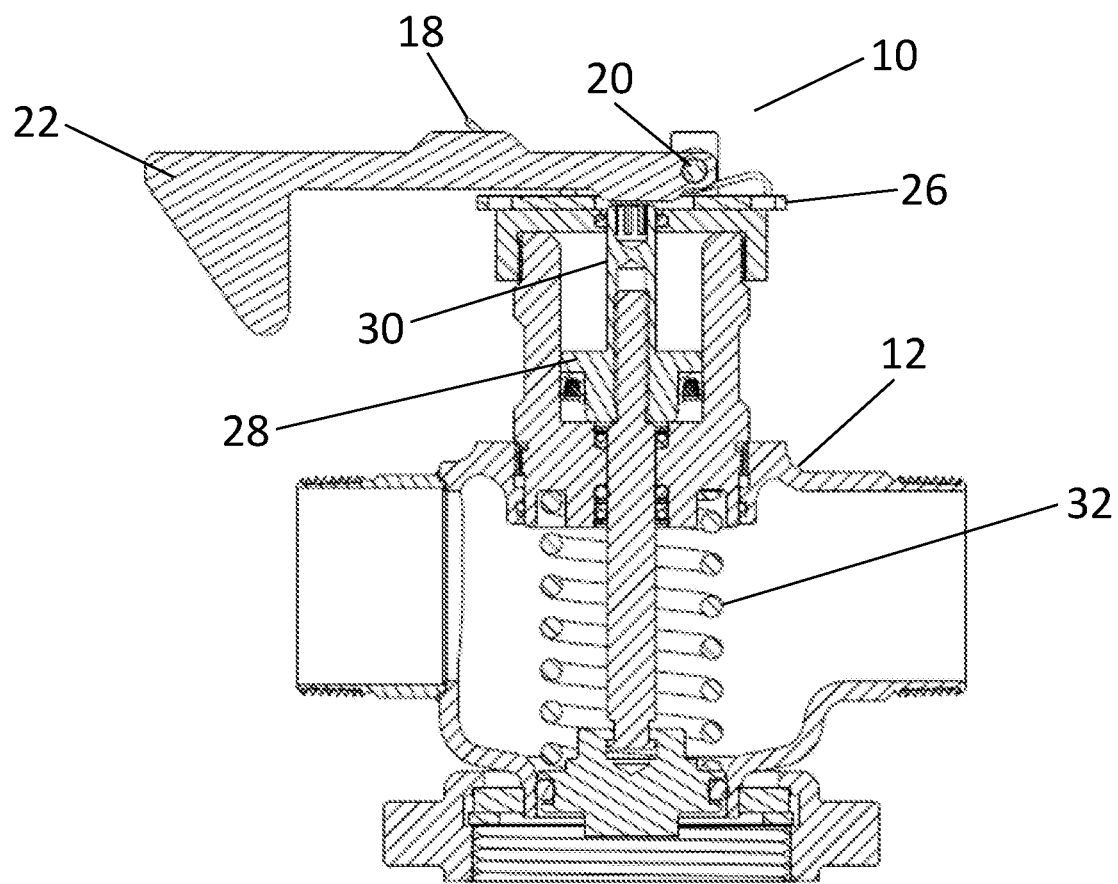
FIG. 5 is a cross section view of the secondary indicator of FIG. 4.
Figure 6:
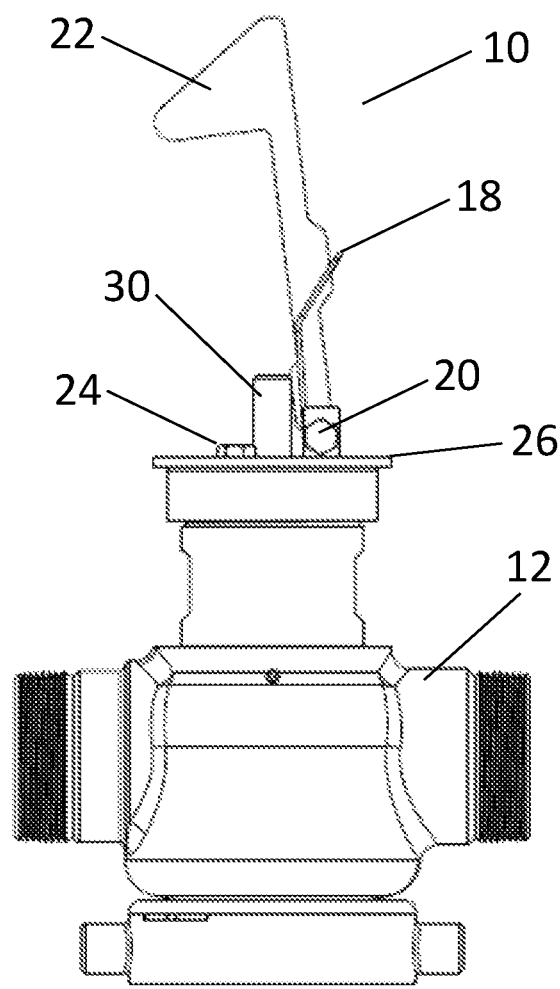
FIG. 6 is the secondary indicator mounted to a valve in the open position.
Figure 7:
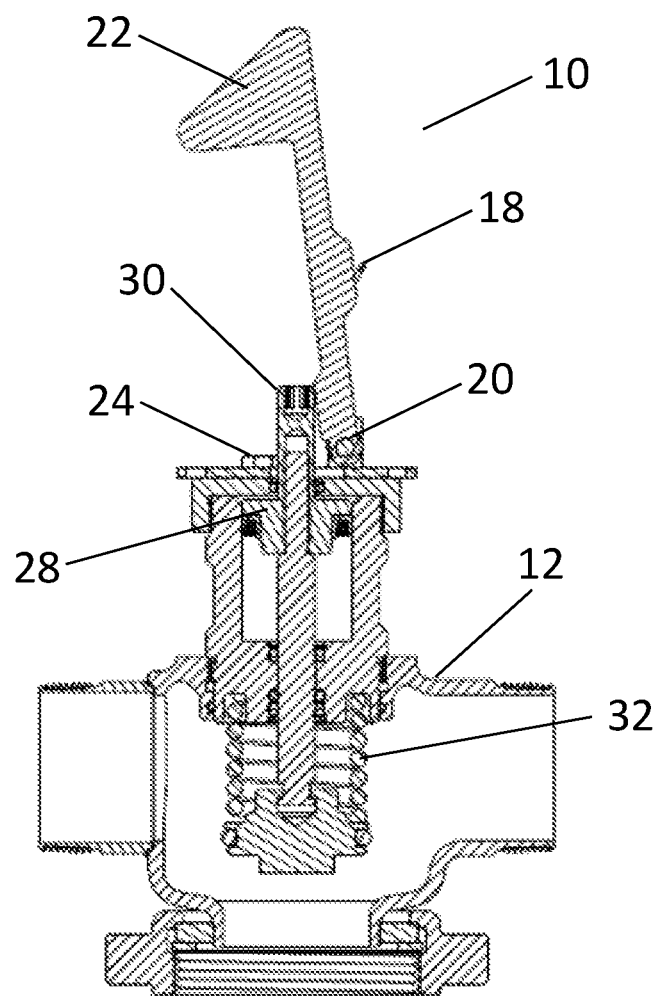
FIG. 7 is a cross section view of the secondary indicator of FIG. 6.

FIG. 3 shows that the secondary indicator 10 comprises of a torsional spring 18, a fixed pin 20, a signal 22, mounting bolts 24, and a rotational plate 26 with variable location slots 27. FIG. 4 shows the secondary indicator 10 mounted to a vapor recovery valve 12. The secondary indicator 10 is mounted to the top vapor recovery valve 12 with the mounting bolts 24 that are secured through the variable location slots 27 in the rotation plate 26. The variable location slots 27 allow the secondary indicator 10 to be rotated on the vapor recovery valve 12 which allows it to be positioned as needed for the particular application to avoid any obstruction in the path of the signal 22.

As best understood by comparing FIGS. 4 through 7, vapor recovery valves 12 comprise a piston 28 and a primary indicator 30 that is attached to the piston 28. The piston 28 is biased in the closed position with a spring 32. Actuation of the vapor recovery valve 12 causes the piston 28 to move linearly in relation to the actuation of the vapor recovery valve 12 and the attached primary indicator 30 moves proportionally in conjunction with the piston 28 to provide an external visual indication that the vapor recovery valve 12 has actuated. The primary indicator 30 is typically a rod that extends above the vapor recovery valve 12 when the vapor recovery valve 12 has actuated. It is obvious from the figures that the primary indicator 30 is not very visible especially considering that the vapor recovery valve 12 is mounted on the top of the tanker 14 and obstructed by the spill dam 13 and the rollover damage protection devices 16. The primary indicator 30 by itself is inadequate to show actuation of the vapor recovery valve 12.

The secondary indicator 10 mounted to the vapor recovery valve 12 but is not attached directly to the primary indicator 30. The secondary indicator is a second class lever in which the torsional spring 18 is the effort, the fixed pin 20 is the fulcrum, and the primary indicator 30 is the load between the torsional spring 18 and the fixed pin 20. The torsional spring 18 pushes down on the signal 22 to keep it in the lower position that provides additional effort to the second class lever. When the vapor recovery valve 12 is actuated, the signal 22 rotates with the linear movement of the primary indicator 30 to multiply the effect of the primary indicator 30. Because the secondary indicator 10 is not attached to the primary indicator 30, manual rotation of the signal 22 does not cause the primary indicator 30 to move. This prevents external tampering with the vapor recovery valve 12 through the secondary indicator 10. This also prevents the vapor recovery valve 12 from being opened if the secondary indicator 10 is hit by any obstruction such as a tree branch.

While the figures show that the signal 22 is a flag, it can be of different lengths and colors and is not limited to material selection or design (flag, post, etc.). In addition, the secondary indicator 10 could be configured to trigger a tertiary indicator that could be an electronic alarm or an audible alarm or combination thereof.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A secondary indicator for a vapor recovery valve comprising:
   wherein the vapor recovery valve comprises a piston and a primary indicator;
   wherein the primary indicator is attached to or is part of the piston; and
   wherein actuation of the vapor recovery valve causes the piston to move linearly in relation to the vapor recovery valve and the primary indicator moves proportionally in conjunction with the piston to provide a visual indication that the vapor recovery valve has actuated;
   said secondary indicator mounted to the vapor recovery valve and is not attached to the primary indicator; and
   said secondary indicator is a second class lever that comprises a signal, a torsional spring, and a fixed pin, wherein said torsional spring is the effort, said fixed pin is the fulcrum, and the primary indicator is the load between said torsional spring and said fixed pin, such that said signal rotates with the linear movement of the primary indicator to multiply the effect of the primary indicator.

2. The secondary indicator of claim 1 further comprising said secondary indicator is mounted to a rotational plate that is further mounted onto the valve wherein said rotational plate allows 360 degree rotation of said secondary indicator relative to the valve.

3. The secondary indicator of claim 1 further comprising said signal has the shape of a flag or a post.

4. The secondary indicator of claim 1 further comprising the rotation of said signal triggers a tertiary indicator.

5. The secondary indicator of claim 1 further comprising the rotation of said signal triggers a tertiary indicator and the tertiary indicator is an electronic alarm or an audible alarm.

6. The secondary indicator of claim 1 further comprising manual rotation of the signal does not cause the primary indicator to move.

* * * * *